(12) United States Patent
Johnson et al.

(10) Patent No.: US 6,832,623 B2
(45) Date of Patent: Dec. 21, 2004

(54) GAS METER VALVE AND METHOD

(75) Inventors: Danny A. Johnson, Leonard, TX (US); James S. Powell, Princeton, TX (US)

(73) Assignee: Basic Resources, Inc., Dallas, TX (US)

( * ) Notice: Subject to any disclaimer, the term of this patent is extended or adjusted under 35 U.S.C. 154(b) by 0 days.

(21) Appl. No.: 10/655,857

(22) Filed: Sep. 5, 2003

(65) Prior Publication Data

US 2004/0045599 A1 Mar. 11, 2004

Related U.S. Application Data

(60) Provisional application No. 60/408,828, filed on Sep. 6, 2002.

(51) Int. Cl.⁷ .................... F16K 43/00; F16K 35/06; G01F 15/18
(52) U.S. Cl. .................... 137/315.06; 29/402.08; 29/890.121; 29/890.149; 70/177; 70/180; 73/201; 137/15.03; 137/15.22; 137/385; 251/95; 251/292; 285/30
(58) Field of Search .................... 29/402.08, 890.121, 29/890.14, 890.149; 70/177, 178, 180; 73/201, 40.5 R, 46; 137/15.03, 315.06, 382, 385, 315.41, 15.22, 312; 251/95, 101, 102, 104, 111, 113; 285/30

(56) References Cited

U.S. PATENT DOCUMENTS

| | | | | | |
|---|---|---|---|---|---|
| RE7,598 E | * | 4/1877 | Hall | .................... | 70/180 |
| 219,441 A | * | 9/1879 | Bryan | .................... | 70/180 |
| 932,437 A | * | 8/1909 | Brady | .................... | 70/180 |
| 3,865,130 A | * | 2/1975 | Mullis | .................... | 137/385 |
| 4,142,562 A | | 3/1979 | Murray | .................... | 141/206 |
| 4,693,451 A | | 9/1987 | Tricini | .................... | 251/163 |
| 4,962,784 A | * | 10/1990 | Collins | .................... | 137/15.03 |
| 4,971,289 A | * | 11/1990 | Pietras | .................... | 70/177 |
| 5,437,300 A | | 8/1995 | Winnie et al. | .................... | 137/112 |
| 5,482,073 A | | 1/1996 | Winnie et al. | .................... | 137/15.03 |
| 5,494,068 A | | 2/1996 | Schuster | .................... | 137/460 |
| 5,501,331 A | * | 3/1996 | Lyall et al. | .................... | 137/315.06 |
| 5,620,022 A | | 4/1997 | Manoogian | .................... | 137/383 |
| 5,687,758 A | | 11/1997 | Schuster | .................... | 137/460 |
| 5,823,223 A | | 10/1998 | Franklin et al. | .................... | 137/38 |
| 5,853,019 A | | 12/1998 | Hollenbach | .................... | 137/38 |
| 5,934,304 A | * | 8/1999 | Peterson et al. | .................... | 73/201 |
| 5,971,003 A | | 10/1999 | Lyall et al. | .................... | 137/112 |
| 5,992,439 A | * | 11/1999 | McGill | .................... | 73/201 |
| 6,196,268 B1 | | 3/2001 | Steiner et al. | .................... | 137/625.47 |
| 6,276,388 B1 | | 8/2001 | Kiryczun | .................... | 137/45 |
| 6,467,500 B2 | * | 10/2002 | Fridlyand | .................... | 137/385 |
| 6,604,548 B2 | | 8/2003 | Geisinger | .................... | 138/45 |
| 6,648,009 B1 | * | 11/2003 | Craig et al. | .................... | 137/385 |
| 6,705,340 B1 | * | 3/2004 | McGill et al. | .................... | 137/315.06 |

* cited by examiner

*Primary Examiner*—George L. Walton
(74) *Attorney, Agent, or Firm*—Hunton & Williams LLP (57) ABSTRACT

Disclosed is a gas meter valve for connection to an outlet of a gas meter and a method for its use. The gas meter valve comprises a valve inlet coupleable to the meter outlet, a valve outlet coupleable to piping for supplying gas to a customer and a valve body coupled to the valve inlet and the valve outlet. The valve body includes a chamber for communicating gas from the valve inlet to the valve outlet and a valve assembly disposed in the chamber and adapted to prevent the communication of gas through the chamber when the valve assembly is in a first position and permit the communication of gas through the chamber when the valve assembly is in a second position. The gas meter valve further includes an actuating mechanism coupled to the valve assembly for positioning the valve assembly in the first position and the second position.

26 Claims, 4 Drawing Sheets

GAS METER VALVE AND METHOD

CROSS-REFERENCE TO RELATED APPLICATIONS

The present invention claims benefit of U.S. Provisional Application No. 60/408,828, filed Sep. 6, 2002, the entirety of which is incorporated by reference herein.

FIELD OF THE INVENTION

This invention relates generally to gas metering and more particularly, but not by way of limitation, to a gas meter outlet valve for selectively shutting off a supply of gas on an outlet of a gas meter.

BACKGROUND OF THE INVENTION

Metered gas supply systems are frequently utilized to supply natural gas or other gasses to consumer or commercial structures. These gas systems typically include a supply line for providing a gas supply from a gas utility to the customer's structure, piping for distributing gas within the customer's structure, and a gas meter having an inlet coupled to the supply line and an outlet coupled to the customer piping. The gas meter therefore may be used by the gas utility to meter the supply of gas provided to the customer's structure for billing and other purposes.

To discontinue gas service, such as to repair leaks or make modifications to the customer's piping, the gas utility typically dispatches a technician to manually shut off the meter supplying gas to the customer's structure. The technician physically turns a shutoff valve that is positioned on the inlet side of the gas meter, which generally is owned and operated by the gas utility. After repairs are made to the customer's piping, a gas utility technician is again dispatched to turn the shutoff valve back on and re-energize the gas meter to restore gas service to the customer's structure.

There are a number of disadvantages to this conventional practice, including excessive wear and tear on the gas meter from repeatedly shutting the meter off and subsequently re-energizing the meter, as well as the excessive time and cost incurred by the gas utility when technicians are dispatched to turn off and on the gas meter. Furthermore, the delay incurred while waiting for the technician to arrive often frustrates customers who are looking for their gas service to be restored.

For at least these reasons, a need exists for an improved gas meter valve and method that overcomes the disadvantages of previous gas meter valves and methods.

SUMMARY OF THE INVENTION

Aspects of the present invention overcome the problems noted above, and realize additional advantages. In accordance with one aspect of the present invention, a gas meter valve for connection to a meter outlet of a gas meter is provided. The gas meter valve comprises a valve inlet coupleable to the meter outlet and adapted to communicate gas from the meter outlet, a valve outlet coupleable to piping for supplying gas to a customer and adapted to communicate gas to the piping and a valve body coupled to the valve inlet and the valve outlet. The valve body includes a chamber for communicating gas from the valve inlet to the valve outlet and a valve assembly disposed at least partially in the chamber and adapted to prevent the communication of gas through the chamber when the valve assembly is in a first position and permit the communication of gas through the chamber when the valve assembly is in a second position. The gas meter valve further includes an actuating mechanism operably coupled to the valve assembly and adapted to position the valve assembly in the first position and the second position.

In accordance with another aspect of the present invention, a gas supply system is provided. The gas system comprises a gas meter having a meter inlet for receiving a gas supply and a meter outlet for providing the gas supply and a valve. The valve includes a valve inlet coupled to the meter outlet and adapted to communicate gas from the meter outlet, a valve outlet coupled to piping for supplying gas to a customer and adapted to communicate gas to the piping, and a valve body coupled to the valve inlet and the valve outlet. The valve body includes a chamber for communicating gas from the valve inlet to the valve outlet and a valve assembly disposed at least partially in the chamber and adapted to prevent the communication of gas through the chamber when the valve assembly is in a first position and permit the communication of gas through the chamber when the valve assembly is in a second position. The valve further includes an actuating mechanism operably coupled to the valve assembly and adapted to position the valve assembly in the first position and he second position.

In one aspect, the valve outlet includes a threaded inner surface and a bushing having a threaded outer surface and threaded inner surface, the threaded outer surface of the bushing adapted to receive the threaded inner surface of the valve outlet and the threaded inner surface of the bushing adapted to receive a threaded outer surface of the piping for supplying gas to the customer. The valve inlet may further include a swivel and swivel nut for coupling the valve inlet to the meter outlet.

In an additional aspect, the actuating mechanism includes a keyed receptacle operable to receive a tool for manipulating a position of the actuating mechanism. The actuating mechanism may include a manually operable flange mounted on an exterior of the valve body.

The valve body may further include an opening extending through a portion of the valve body and the actuating mechanism may further include an opening extending through a portion of the actuating mechanism such that the opening through the portion of the actuating mechanism is at least partially aligned with the opening through the portion of the valve body when the actuating mechanism is operated to position the valve assembly in the first position. The openings may be adapted to receive a tamper-proofing mechanism extendable through the openings to prevent the actuating mechanism from being operated to position the valve assembly in the second position.

In one aspect, the valve assembly includes a ball valve assembly. In another aspect, the valve assembly includes a soft seat valve assembly.

The valve inlet, valve outlet and valve body are arranged so as to replace an existing piping portion provided between the meter outlet of the gas meter and the piping for supplying gas to the customer. Further, in one aspect, a connection of the valve inlet to the valve body is substantially perpendicular to a connection of the valve outlet to the valve body.

In a gas supply system comprising a gas meter having a meter outlet, a first piping portion operably coupled to the meter outlet and a second piping portion operably coupled to the first piping portion, a method for shutting off a gas supply to a customer while maintaining a gas supply to the gas meter is provided. The method comprises the steps of disconnecting the first piping portion from the gas meter and the second piping portion and providing a gas meter valve.

The gas meter valve comprises a valve inlet coupleable to the meter outlet and adapted to communicate gas from the meter outlet, a valve outlet coupleable to piping for supplying gas to a customer and adapted to communicate gas to the second piping portion, and a valve body coupled to the valve inlet and the valve outlet. The valve body includes a chamber for communicating gas from the valve inlet to the valve outlet and a valve assembly disposed at least partially in the chamber and adapted to prevent the communication of gas through the chamber when the valve assembly is in a first position and permit the communication of gas through the chamber when the valve assembly is in a second position. The gas meter valve further includes an actuating mechanism operably coupled to the valve assembly and adapted to position the valve assembly in the first position and the second position. The method further includes connecting the valve inlet to the meter outlet, connecting the valve outlet to the second piping portion and operating the actuating mechanism to position the valve assembly in the first position to prevent a flow of gas from the meter outlet to the second piping portion. In one aspect, the valve inlet includes a swivel and swivel nut for coupling the valve inlet to the meter outlet.

In accordance with another aspect, the method further comprises detecting a leak in the second piping portion, dispatching a gas system technician to operate the actuating mechanism to position the valve in the first position, repairing the leak in the second piping portion and dispatching an authorized repair technician to operate the actuating mechanism to position the valve in the second position.

In one aspect, the first piping portion includes a riser coupled to the meter outlet, an elbow having an inlet coupled to the riser and an outlet coupled to the second piping portion. An angle of a bend of the elbow may be substantially 90°.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which:

FIGS. 2A–6 are side views of various exemplary implementations of the gas meter valve illustrated in FIG. 1 in accordance with at least one aspect of the present invention.

DETAILED DESCRIPTION OF THE INVENTION

The following description is intended to convey a thorough understanding of the invention by providing a number of specific embodiments and details related to a gas supply system having a gas meter valve and a method for its use. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The term gas, as used herein, may include any of a variety of gasses, including, but not limited to, natural gas, propane, kerosene, and acetylene. Further, the term gas also may incorporate various fluids often supplied by way of a plumbing system that utilizes metering, including, for example, water, oil and gasoline. For ease of illustration, the exemplary gas meter valve and method depicted in FIGS. 1–7 is discussed in the context of a natural gas supply system. However, those skilled in the art may incorporate the gas meter valve disclosed herein in other metered supply systems without departing from the spirit or the scope of the present invention.

Figure 1:
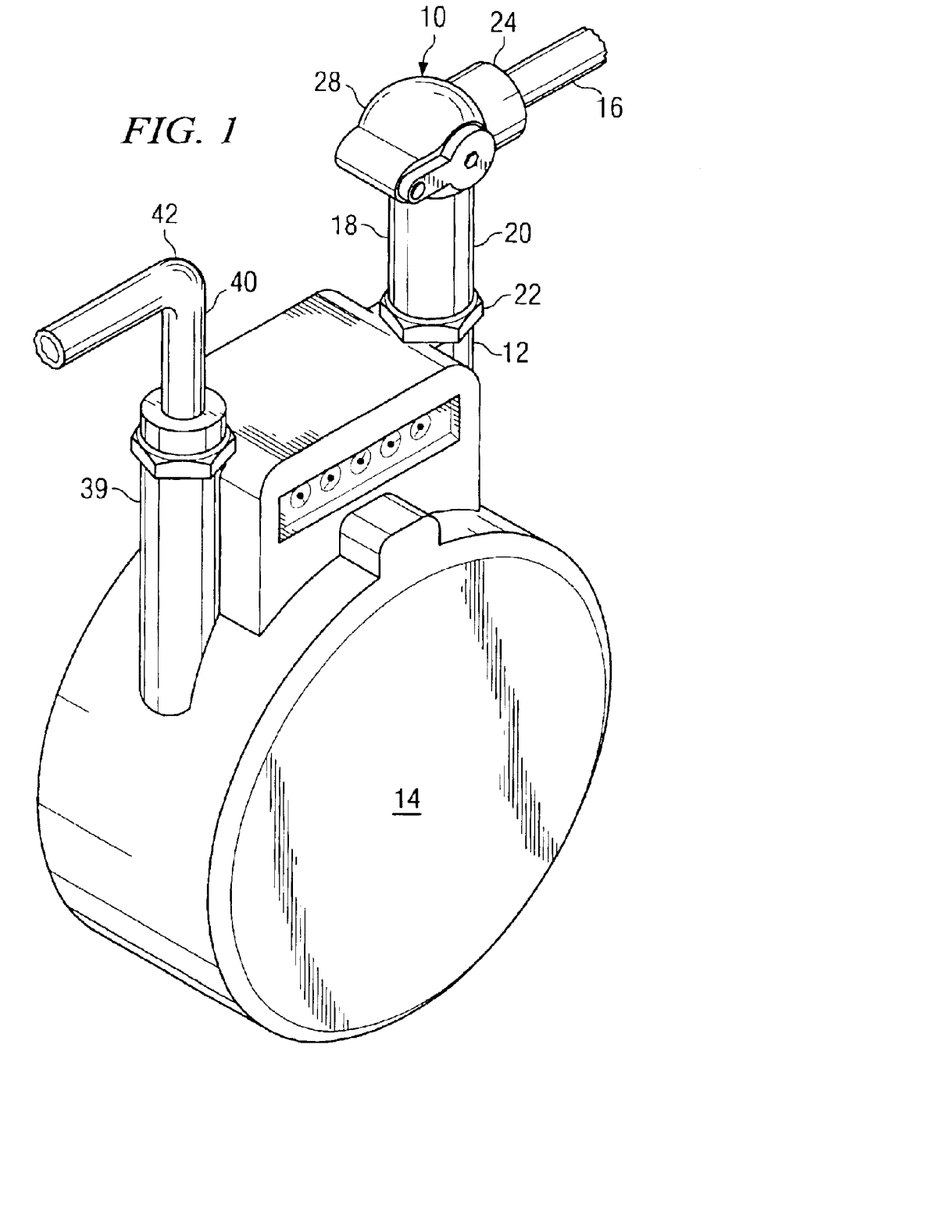
FIG. 1 is a perspective view of an exemplary gas meter having a gas meter valve provided on an outlet side of the gas meter in accordance with at least one aspect of the present invention.

Referring now to FIG. 1, an exemplary gas supply system incorporating a gas meter 14 and a gas meter valve 10 for controlling the flow of natural gas is illustrated in accordance with at least one aspect of the present invention. The gas meter 14 preferably is used for metering and measuring a quantity of natural gas supplied to a customer and may include any of a variety of gas meters utilized by gas utilities for this purpose. In the illustrated example, the gas meter valve 10 is connected to a meter outlet 12 of the gas meter 14. The gas meter valve 10 is also connected to customer piping 16 used to conduct the supply of gas, such as natural gas, from the gas meter 14 to the customer structure. It will be appreciated that the present invention offers certain advantages when employed on the meter outlet 12 of the gas meter 14, but the gas meter valve 10 may be beneficially employed at a variety of locations. One advantage of installing the gas meter valve 10 on the meter outlet 12 of the gas meter 14 is that the gas meter valve 10 may be utilized to discontinue or interrupt gas service to the customer while maintaining the gas supply to the gas meter, thereby reducing the wear and tear on the meter and eliminating the need to reenergize the gas meter 14.

The gas meter valve 10 includes a valve inlet 18 which may include a swivel 20 and a swivel nut 22. The swivel nut 22 may be threaded to engage a threaded portion (not shown) on the meter outlet 12 of the gas meter 14. The gas meter valve 10 further includes a valve outlet 24 adapted to couple to the customer piping 16 by threading, clamping or other means commonly employed and well known in the art. The gas meter valve 10 may be constructed from any suitable material or combination of materials, such as steel, iron, rigid polymeric materials or other materials well known in the art for use in such applications.

As previously discussed, gas meters typically are provided with piping which may be similar in some installations on both a meter inlet 39 and the meter outlet 12 of the gas meter 14. For simplicity and ease of understanding for the present purposes, the piping on the meter inlet 39 of the gas meter 14 will be described since it is generally is substantially similar to the piping that generally exists on the meter outlet 12. Further, it should be understood that although the gas meter valve 10 preferably is installed on the meter outlet 12 of the gas meter 14, in certain situations it may be more appropriate to install the gas meter valve 10 on the meter inlet 39 of the gas meter 14.

The piping often includes a riser 40 with an ell or elbow 42 that effects a substantially 90 degree bend in the piping. One advantage of the gas meter valve 10 of the present invention is that it may be installed simply by replacing at least a portion of the riser 40 and elbow 42 that generally exist on the meter outlet 12 of the gas meter 14, as the gas meter valve 10 preferably is adapted to fit in place of the piping frequently used with conventional gas meters without modification or alteration to at least a substantial portion of the customer piping 16 or the piping on the meter inlet 39 of the gas meter 14.

To effect this convenient and easy installation, the gas meter valve 10 may be configured for installation in piping having conventional dimensions such that the gas meter valve 10 may be utilized in place of the present piping with minimal or no modifications or adaptations to the existing piping. Examples of conventional dimensions for piping include, for example, diameters of one inch (1"), one and a quarter inches (1¼"), one and a half inches (1½"), or two inches (2").

According to one aspect of the present invention the gas meter valve 10 may be installed in place of all or part of the riser 40 and elbow 42 on the meter outlet 12 of the gas meter 14. In other aspects, the gas meter valve 10 may include a shortened valve inlet 18 so as that the present invention is used to replace only the elbow 42 portion of the piping on the meter outlet 12 of the gas meter 14.

It will be appreciated that, while the gas meter valve 10 is illustrated such that the body of the gas meter valve 10 is substantially rounded or oval, the gas meter valve 10 may be provided in a number of different shapes and configurations (e.g., rectangular or tubular) which are within the scope of the present invention. Further, the valve outlet 24 of the gas meter valve 10 preferably is positioned substantially perpendicular to the valve inlet 18 so as to readily adapt to existing piping. Although such configuration of the valve inlet 18 to the valve outlet 24 is preferably described as a right angle (i.e., a 90° angle), in other aspects this relationship may be substantially 90° (e.g., 90°±20°).

Figure 2A:
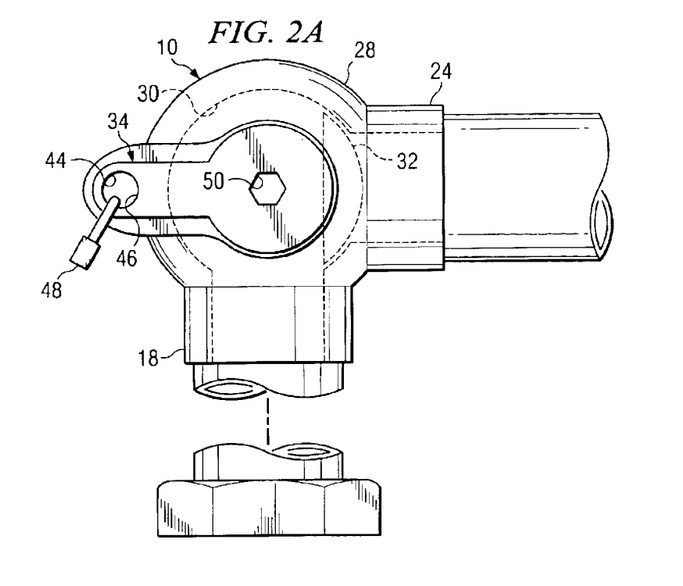
Figure 2B:
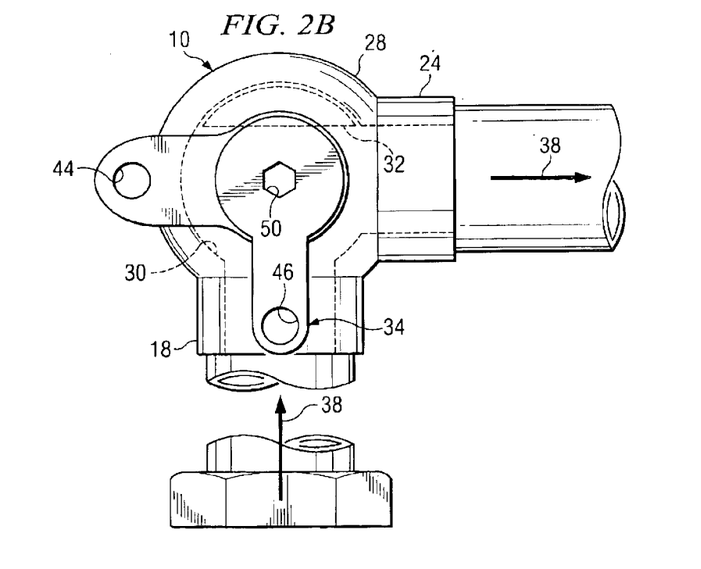

Referring now to FIGS. 2A and 2B, enlarged side views of the gas meter valve 10 are illustrated in accordance with one aspect of the present invention. The gas meter valve 10 includes a valve body 28 defining a chamber 30. The chamber 30 provides an enclosed passage for communicating gas from the valve inlet 18 to the valve outlet 24 (indicated by direction 38). A valve assembly 32 is disposed at least partially within the chamber 30 and operable to interrupt the flow of gas in a closed position (illustrated in FIG. 2A) and to permit the flow of gas in an open position (illustrated in FIG. 2B).

An actuating mechanism 34 preferably is provided on the exterior of the valve body 28 and is operably coupled to the valve assembly 32 for positioning the valve assembly 32 to selectively turn on and off the supply of gas between the gas meter 14 and the customer piping 16. The direction 38 of gas flow from the valve inlet 18 through the chamber 30 and through the valve outlet 24 may be interrupted by the valve assembly 32 when the actuating mechanism 34 and valve assembly 32 are in the closed position. Conversely, the actuating mechanism 34 and valve assembly 32 may be manually manipulated to the open position to permit the flow of gas through the chamber 30 in the direction 38. The actuating mechanism 34 is coupled to the valve assembly 32 using any of a variety of techniques, such as by welding, the use of a threaded coupling, rods, levers or gears, etc., such that when the actuating mechanism 34 is rotated or actuated, the valve assembly 32 may be positioned for interrupting or promoting the flow of gas through the gas meter valve 10.

The valve assembly 32 may include any of a variety of suitable valves well known to those of ordinary skill in the art that may be employed for the described purposes. In one aspect, a soft seat valve assembly preferably is implemented as valve assembly 32 due to the nearly complete interruption of gas flow provided by such valves. One exemplary configuration of a soft seat valve assembly is described in U.S. Pat. No. 6,196,268 to Steiner et al. In other aspects, however, other well-known valve configurations, such as a ball valve assembly, may be used as appropriate.

FIG. 2A illustrates the gas meter valve 10 operating in a closed position. As illustrated, the actuating mechanism 34 is positioned so that the corresponding position of the valve assembly 32 interrupts the flow of gas from the chamber 30 to the outlet 24 by, for example, sealing the passage between the chamber 30 and the outlet 24. Conversely, FIG. 2B illustrates the gas meter valve 10 operating in an open position. As illustrated, the actuating mechanism 34 is positioned so that the corresponding position of the valve assembly 32 permits the flow of gas from the chamber 30 to the outlet 24. This may be accomplished by, for example, positioning at least a portion of the valve assembly 32 so that the passage between the chamber 30 and the outlet 24 is at least partially unobstructed.

It will be appreciated that it maybe advisable to prevent unauthorized individuals from tampering with a position of the actuating mechanism 34 and valve assembly 32 set by a technician or other qualified individual. Accordingly, the valve body 28 may be provided with an opening 44 and the actuating mechanism 34 may be provided with an opening 46 configured so that when the actuating mechanism 34 is rotated to position the valve assembly 32 in the open position the openings 44 and 46 are aligned (as shown in FIG. 2A). Alternatively, the openings 44, 46 may be configured to be aligned when the actuating mechanism 34 is rotated to position the valve assembly 32 in the closed position. A tamper-proofing mechanism 48, such as a lock or tag, then may be placed through the aligned openings 44 and 46 on the gas meter valve 10 to prevent tampering with the set position of the actuating mechanism 34 and valve assembly 32. Other mechanisms of positioning the valve assembly 32 to permit or obstruct the gas flow may be utilized based on the type of the valve assembly 32 using the guidelines provided herein.

To further prevent tampering, the actuating mechanism 34 may include a keyed receptacle 50 defining an opening in or structure on the actuating mechanism 34 configured such that a special tool (not shown) compatible with the keyed receptacle 50 is required to manipulate the position of the actuating mechanism 34 and, therefore, the position of the valve assembly 32. Although the keyed receptacle 50 is illustrated in FIG. 2 as having an octagonal opening, the keyed receptacle 50 may have any of a variety of shapes, such as an octagonal, triangular, square, hex, philips, star or slotted shape, and preferably is of a non-standard configuration to ensure that a standard toolkit would not have a tool capable of engaging the actuating mechanism 34 for the purposes of operating the gas meter valve 10.

On advantage of at least one aspect of the gas meter valve 10 is that customers may reinitiate gas service by using an authorized plumber or other authorized individual having a tool compatible with the keyed receptacle 50 without requiring the gas utility to incur the expense and time of sending the utility's technician to re-energize the gas meter. This provides another advantage in that the gas may be more quickly, easily and efficiently provided to the customer once the repairs have been made without the need to wait on the gas utility personnel to return to turn on the gas service and re-energize the meter.

Figure 3:
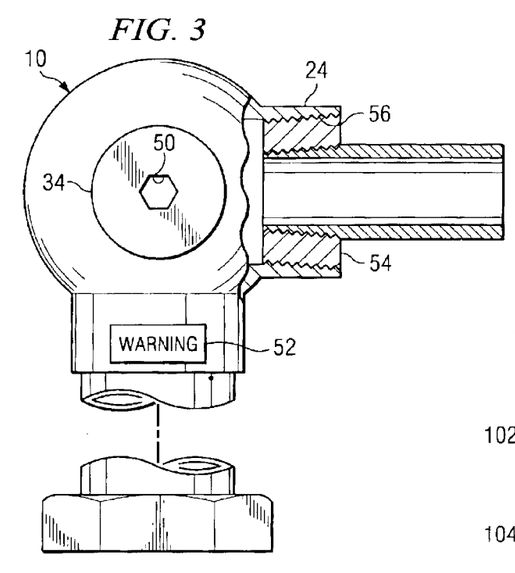

Referring now to FIG. 3, the gas meter valve 10 is further illustrated in accordance with at least one aspect of the present invention. A sleeve or bushing 54 may be provided to receive a threaded inner surface 56 of the valve outlet 24 of the gas meter valve 10, where the bushing 54 includes a threaded outer surface and threaded inner surface, the threaded outer surface of the bushing 54 to receive the threaded inner surface 56 of the valve outlet and the threaded inner surface of the bushing 54 to receive a threaded outer surface of the customer piping 16. The threaded inner surface 56 may be provided for the largest typical size to fit to the customer piping 16, such as, for example, a two-inch (2") diameter pipe. In the event the customer piping 16 is of a smaller size and/or of a different thread count/type, in lieu of multiple configurations of the gas meter valve 10, a bushing 56 may be provided in various adaptor sizes to the repair technician to adapt the threaded inner surface 56 to the appropriate size/thread type of the customer piping 16. The valve outlet 24 of the gas meter valve 10 therefore may be provided in one standard size and, by employing the threaded bushing 54, may be adapted to a plurality of customer piping 16 dimensions.

As noted above, it often is desirable to prevent tampering of the set position of the valve assembly 32. In addition to, or instead of, using the tamper-proofing mechanisms (e.g., the keyed receptacle 50) described herein, a repair technician may put a warning sticker or label 52 on the gas meter valve 10 to indicate the current position of the gas meter valve 10. To illustrate, when a leak is detected in the customer's piping and the gas utility desires to discontinue gas service to the customer piping 16 for safety and other reasons, the gas utility may send a repair technician to shut off the gas meter valve 10. Once the gas has been shut off, the repair technician may then put the warning label 52 on the gas meter valve 10 to indicate that gas service has been interrupted and that only a qualified or authorized individual should operate the gas meter valve 10. The warning label 52 combined with the keyed receptacle 50 are intended to prevent unauthorized individuals from re-initiating gas service to the customer piping until the appropriate repairs have been made.

Figure 4:
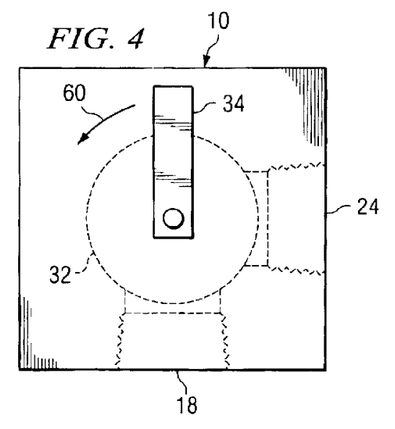

Referring now to FIG. 4, an alternate exemplary implementation of the gas meter valve 10 is illustrated. In the illustrated example, the actuating mechanism 34 includes a flange or level manually operable by an individual for easily operating the gas meter valve 10. Further, as illustrated, the gas meter valve 10 may have a substantially rectangular shape and the valve assembly 32 may implement a ball valve configuration. When the flange of the actuating mechanism 34 is rotated in a direction 60 the valve assembly 32, operably coupled to the actuating mechanism 34, is rotated to an open position such that gas may be communicated between the valve inlet 18 and the valve outlet 24. Conversely, when the flange is rotated counter to direction 60, the valve assembly 32 may be rotated to a closed position, thereby preventing the flow of gas between the valve inlet 18 and the valve outlet 24.

Figure 5:
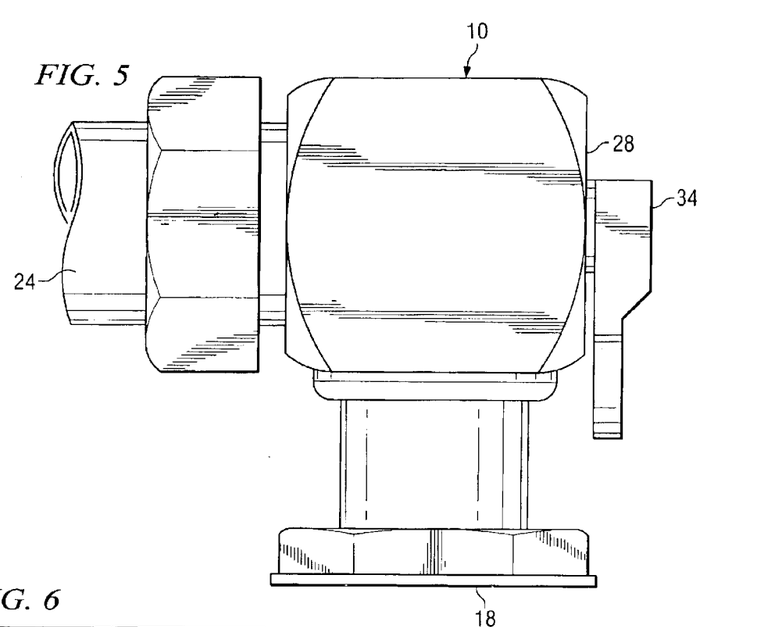
Figure 6:
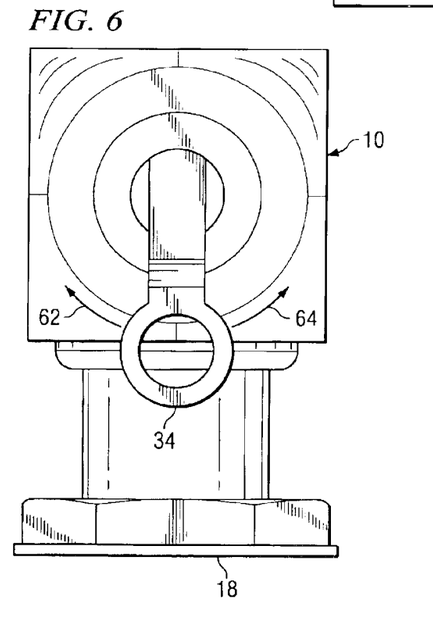

Referring now to FIGS. 5 and 6, a side view (FIG. 5) and a back view (FIG. 6) of another exemplary configuration of the gas meter valve 10 are illustrated. The actuating mechanism 34 may include a lever provided on a back portion of the valve body 28. The actuating mechanism 34 may be rotated in a direction 62, or in other aspects in a direction 64, to position the valve assembly 32 (configured as a soft seat valve) to achieve a complete (or substantially complete) discontinuation of the communication of gas between the valve inlet 18 and the valve outlet 24 of the gas meter valve 10.

Figure 7:
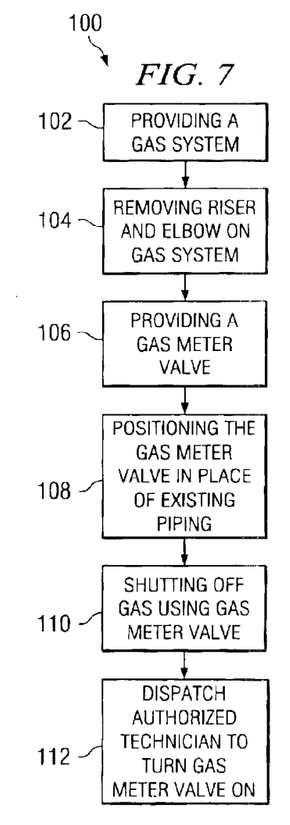
FIG. 7 is a flow-chart illustrating an exemplary method for shutting off gas to a customer while continuing to supply gas to the gas meter in accordance with at least one aspect of the present invention.

Referring now to FIG. 7, an exemplary method 100 for shutting off gas to a customer's gas piping while continuing to supply gas to a gas meter without requiring that the gas meter be re-energized is illustrated in accordance with at least one aspect of the present invention. The method 100 initiates at step 102 whereby a gas system substantially similar to the one described in FIG. 1 is provided. The gas system preferably includes the gas meter 14 having the meter inlet 39 and the meter outlet 12 with a piping portion including a riser 40 coupled to the meter outlet 12 and an elbow 42 connected to the other end of the riser 40. In this manner, an inlet of the riser 40 and an outlet of elbow 42 are in a substantially perpendicular relationship. The customer piping 16 is connected to the outlet side of the elbow 42.

At step 104, a leak in the gas system is detected (or a modification to the system is desired) and a gas system technician is dispatched to remove the elbow 42, and in some aspects the riser 40 as well, from the gas meter 14 and customer piping 16.

At step 106, a gas meter valve 10, such as described above, is provided. At step 108, the gas meter valve 10 is positioned in place of the removed elbow 42 and riser 40 which were previously removed. The gas meter valve 10 then is connected such that the valve inlet 18 of the gas meter valve 10 is connected to the meter outlet 12 of the gas meter 14, and the valve outlet 24 of the gas meter valve 10 is coupled to the customer piping 16. At step 110, the gas technician operates the actuating mechanism 34 to shut off the gas to the customer piping 16 by placing the actuating mechanism 34 in the closed position.

According to some aspects, the method 100 may further include placing tamper-proofing indicia, such as the tag 48 and/or the label 52, on the gas meter valve 10 indicating the status of the valve and, in some aspects, may identify those authorized to operate the gas meter valve 10 as well. The method further may include repairing the leak to the customer piping 16 and authorizing repair technicians to reestablish service to the customer. At step 112, the authorized repair technician is dispatched to operate the actuating mechanism 34 with a tool compatible the keyed receptacle 50 (when the keyed receptacle 50 is provided) to reinitiate the flow of gas to the customer piping 16. The method also provides for removing the label 52 and tag 48 from the gas meter valve 10.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A gas meter valve for connection to a meter outlet of a gas meter, the gas meter valve comprising:
   a valve inlet coupleable to the meter outlet and adapted to communicate gas from the meter outlet;
   a valve outlet coupleable to piping for supplying gas to a customer and adapted to communicate gas to the piping;
   a valve body coupled to the valve inlet and the valve outlet, the valve body including:
      a chamber for communicating gas from the valve inlet to the valve outlet; and
      a valve assembly disposed at least partially in the chamber and adapted to:
         prevent the communication of gas through the chamber when the valve assembly is in a first position; and
         permit the communication of gas through the chamber when the valve assembly is in a second position, wherein the valve inlet, valve outlet and valve body are arranged so as to replace an existing piping portion provided between the meter outlet of the gas meter and the piping for supplying gas to the customer; and
   an actuating mechanism operably coupled to the valve assembly and adapted to position the valve assembly in the first position and the second position.

2. The gas meter valve of claim 1, wherein the valve outlet includes a threaded inner surface and a bushing having a threaded outer surface and threaded inner surface, the threaded outer surface of the bushing adapted to receive the threaded inner surface of the valve outlet and the threaded inner surface of the bushing adapted to receive a threaded outer surface of the piping for supplying gas to the customer.

3. The gas meter valve of claim 1, wherein the actuating mechanism includes a keyed receptacle operable to receive a tool for manipulating a position of the actuating mechanism.

4. The gas meter valve of claim 1, wherein the actuating mechanism includes a manually operable flange mounted on an exterior of the valve body.

5. The gas meter valve of claim 1, wherein the valve body further includes an opening extending through a portion of the valve body and the actuating mechanism further includes an opening extending through a portion of the actuating mechanism such that the opening through the portion of the actuating mechanism is at least partially aligned with the opening through the portion of the valve body when the actuating mechanism is operated to position the valve assembly in the first position.

6. The gas meter valve of claim 5, wherein the opening through the portion of the valve body and the opening of the portion of the actuating mechanism are adapted to receive a tamper-proofing mechanism extendable through the openings to prevent the actuating mechanism from being operated to position the valve assembly in the second position.

7. The gas meter valve of claim 1, wherein the valve assembly includes a ball valve assembly.

8. The gas meter valve of claim 1, wherein the valve assembly includes a soft seat valve assembly.

9. The gas meter valve of claim 1, wherein the valve inlet includes a swivel and swivel nut for coupling the valve inlet to the meter outlet.

10. The gas meter valve of claim 1, wherein the existing pipe portion is an elbow.

11. The gas meter valve of claim 1, wherein a connection of the valve inlet to the valve body is substantially perpendicular to a connection of the valve outlet to the valve body.

12. A gas supply system comprising:
   a gas meter having a meter inlet for receiving a gas supply and a meter outlet for providing the gas supply; and
   a valve including:
      a valve inlet coupled to the meter outlet and adapted to communicate gas from the meter outlet;
      a valve outlet coupled to piping for supplying gas to a customer and adapted to communicate gas to the piping;
      a valve body coupled to the valve inlet and the valve outlet, the valve body including:
         a chamber for communicating gas from the valve inlet to the valve outlet; and
         a valve assembly disposed at least partially in the chamber and adapted to:
            prevent the communication of gas through the chamber when the valve assembly is in a first position; and
            permit the communication of gas through the chamber when the valve assembly is in a second position, wherein the valve inlet, valve outlet and valve body are arranged so as to replace an existing piping portion provided between the meter outlet of the gas meter and the piping for supplying gas to the customer; and
      an actuating mechanism operably coupled to the valve assembly and adapted to position the valve assembly in the first position and he second position.

13. The gas supply system of claim 12, wherein the valve outlet includes a threaded inner surface and a bushing having a threaded outer surface and threaded inner surface, the threaded outer surface of the bushing adapted to receive the threaded inner surface of the valve outlet and the threaded inner surface of the bushing adapted to receive a threaded outer surface of the piping for supplying gas to the customer.

14. The gas supply system of claim 12, wherein the actuating mechanism includes a keyed receptacle operable to receive a tool for manipulating a position of the actuating mechanism.

15. The gas supply system of claim 12, wherein the actuating mechanism includes a manually operable flange mounted on an exterior of the valve body.

16. The gas supply system of claim 12, wherein the valve body further includes an opening extending through a portion of the valve body and the actuating mechanism further includes an opening extending through a portion of the actuating mechanism such that the opening through the portion of the actuating mechanism is at least partially aligned with the opening through the portion of the valve body when the actuating mechanism is operated to position the valve assembly in the first position.

17. The gas supply system of claim 16, wherein the opening through the portion of the valve body and the opening of the portion of the actuating mechanism are adapted to receive a tamper-proofing mechanism extendable through the openings to prevent the actuating mechanism from being operated to position the valve assembly in the second position.

18. The gas supply system of claim 12, wherein the valve assembly includes a ball valve assembly.

19. The gas supply system of claim 12, wherein the valve assembly includes a soft seat valve assembly.

20. The gas supply system of claim 12, wherein the valve inlet includes a swivel and swivel nut for coupling the valve inlet to the meter outlet.

21. The gas supply system of claim 12, wherein a connection of the valve inlet to the valve body is substantially perpendicular to a connection of the valve outlet to the valve body.

22. In a gas supply system comprising a gas meter having a meter outlet, a first piping portion operably coupled to the meter outlet and a second piping portion operably coupled to the first piping portion, a method for shutting off a gas supply to a customer while maintaining a gas supply to the gas meter, the method comprising the steps of:

disconnecting the first piping portion from the gas meter and the second piping portion;

providing a gas meter valve comprising:

a valve inlet coupleable to the meter outlet and adapted to communicate gas from the meter outlet;

a valve outlet coupleable to piping for supplying gas to a customer and adapted to communicate gas to the second piping portion;

a valve body coupled to the valve inlet and the valve outlet, the valve body including:

a chamber for communicating gas from the valve inlet to the valve outlet; and             a valve assembly disposed at least partially in the chamber and adapted to:

prevent the communication of gas through the chamber when the valve assembly is in a first position; and                 permit the communication of gas through the chamber when the valve assembly is in a second position; and         an actuating mechanism operably coupled to the valve assembly and adapted to position the valve assembly in the first position and the second position;

connecting the valve inlet to the meter outlet;

connecting the valve outlet to the second piping portion; and     operating the actuating mechanism to position the valve assembly in the first position to prevent a flow of gas from the meter outlet to the second piping portion.

23. The method of claim 22, further comprising the steps of:

detecting a leak in the second piping portion;

dispatching a gas system technician to operate the actuating mechanism to position the valve in the first position;

repairing the leak in the second piping portion; and dispatching an authorized repair technician to operate the actuating mechanism to position the valve in the second position.

24. The method of claim 22, wherein the first piping portion includes a riser coupled to the meter outlet, an elbow having an inlet coupled to the riser and an outlet coupled to the second piping portion.

25. The method of claim 24, wherein an angle of a bend of the elbow is substantially 90°.

26. The method of claim 22, wherein the valve inlet includes a swivel and swivel nut for coupling the valve inlet to the meter outlet.

* * * * *